(12) United States Patent
Beer et al.

(10) Patent No.: US 11,911,834 B2
(45) Date of Patent: Feb. 27, 2024

(54) DRILLING TOOL AND METHOD FOR PRODUCING A BOREHOLE

(71) Applicant: EMUGE-Werk Richard Glimpel GmbH & Co. KG, Fabrik für Präzisionswerkzeuge, Lauf a. d. Pegnitz (DE)

(72) Inventors: Christian Beer, Poxdorf (DE); Bernhard Borschert, Bamberg (DE); Thomas Funk, Pegnitz (DE); Dietmar Hechtle, Pegnitz (DE); Manuel Leonhard, Lauf (DE); Martin Steinbach, Rückersdorf (DE)

(73) Assignee: EMUGE-WERK RICHARD GLIMPEL GMBH & CO. KG, FABRIK FÜR PRÄZISIONSWERKZEUGE, Lauf A. D. Pegnitz (DE)

( * ) Notice: Subject to any disclaimer, the term of this patent is extended or adjusted under 35 U.S.C. 154(b) by 0 days.

(21) Appl. No.: 17/237,906

(22) Filed: Apr. 22, 2021

(65) Prior Publication Data
US 2022/0040770 A1 Feb. 10, 2022

(30) Foreign Application Priority Data

Aug. 7, 2020 (DE) .......................... 102020120939.8
Mar. 9, 2021 (DE) .......................... 102021105703.5

(51) Int. Cl.
*B23B 51/02* (2006.01)
*B23B 35/00* (2006.01)

(52) U.S. Cl.
CPC .............. *B23B 51/02* (2013.01); *B23B 35/00* (2013.01); *B23B 2251/48* (2013.01)

(58) Field of Classification Search
CPC ..... B23B 51/02; B23B 35/00; B23B 2251/48; B23B 2251/04; B23B 2251/085
See application file for complete search history.

(56) References Cited

U.S. PATENT DOCUMENTS

| 3,076,357 A | 2/1963 | Benjamin |
| 2009/0110501 A1 * | 4/2009 | Drori ...................... B23B 51/04 408/209 |

(Continued)

FOREIGN PATENT DOCUMENTS

| CA | 2960464 A1 * | 3/2016 | ............. B23B 51/00 |
| CN | 103706843 A * | 4/2014 | ............. B23B 51/02 |

(Continued)

OTHER PUBLICATIONS

English translation of CN-103706843-A (Year: 2014).*

*Primary Examiner* — Alan Snyder
(74) *Attorney, Agent, or Firm* — Workman Nydegger (57) ABSTRACT

A drilling tool for producing a bore with a cylindrical inner wall can be rotatable in a rotary movement with a predetermined rotational direction (VD) about a tool axis (A) extending through the drilling tool, and at the same time is movable in an axial forward movement (VB) in a forward direction axially to the tool axis. The drilling tool comprises at least one drilling area (3) arranged in a forwardly located region of the drilling tool at a forward or free end, but preferably not having a thread forming region. The drilling area has a number n of drilling edges which are arranged offset to each other in the rotational direction, and at least one chip divider is arranged on at least one or each of the n drill cutting edges, where the chip divider forms an interruption of the respective drill cutting edge.

20 Claims, 4 Drawing Sheets

(56) References Cited

U.S. PATENT DOCUMENTS

2015/0314378 A1* 11/2015 Rogalla .................. B23B 51/02
                                                     408/230
2017/0274461 A1*  9/2017 Mabuchi ................ B23B 51/02

FOREIGN PATENT DOCUMENTS

| DE | 7710873 U | 7/1977 |
| DE | 3704196 A1 | 2/1987 |
| DE | 102009024256 A1 | 12/2010 |
| DE | 102016221363 A1 | 3/2018 |
| EP | 3199279 A1 | 8/2017 |

* cited by examiner

DRILLING TOOL AND METHOD FOR PRODUCING A BOREHOLE

CROSS-REFERENCE TO RELATED APPLICATIONS

The present invention claims the benefit of priority to German Patent Application No. 10 2021 105 703.5, filed on Mar. 9, 2021, and to German Patent Application No. 10 2020 120 939.8, filed on Aug. 7, 2020. The entire content of each of the foregoing patent applications is incorporated herein by reference.

BACKGROUND OF THE INVENTION

1. Field of the Invention

The invention relates to a drilling tool and a method for producing a bore.

2. The Relevant Technology

Drilling tools, especially twist drills, for producing holes (without threads) are normally designed with continuous drill cutting edges running from the inside to the outside. This produces shorter curling drilling chips because the radially varying cutting speeds and circumferential lengths of the removed material over the drill cutting edge lead to a reshaping and curling of the chip. These shorter chips are usually well suited for the drilling process. In the case of drilling chips, a distinction is made in particular between helical chips or helical chip pieces or spiral chips or spiral chip pieces or comma chips.

In rather rare applications with larger drilling diameters, where particularly wide drilling chips are produced, so-called chip dividers can be provided in the drill cutting edges of drilling tools, which are combined with downstream chip forming stages or chip breakers (see e.g. DE 37 04 196 A1, DE 10 2009 024 256 A1 or U.S. Pat. No. 3,076,357).

The chip dividers form interruptions of the drill cutting edges and can be designed as grooves or recesses or also as steps on the respective drill cutting edge.

Such chip dividers divide the chips, which are particularly wide for large drill diameters, into narrower chips. However, significantly longer and less curled chips, the so-called band chips, are now produced. Such band chips are useless for the process, in particular because they can get jammed between the tool and the bore wall and damage can occur, even tool breakage. For this reason, state-of-the-art drilling tools with chip dividers combine the chip dividers with downstream chip forming steps or chip dividers in order to form and break the band chips immediately.

From EP 3 199 279 A1, a drilling tool with chip dividers is known, which is primarily intended for drilling holes in workpieces made of carbon fibre-reinforced plastics, especially in the aircraft industry. With these carbon fibre-reinforced plastics, there is a risk of delamination of fibre layers due to the feed load during drilling and of drilling burrs and fibre protrusions, which in particular cause fraying of the edge of the hole. The drilling tool of EP 3 199 279 A1 is intended to counteract this problem. The known drilling tool according to EP 3 199 279 A1 is designed in the manner of a twist drill with a drilling tip and two end cutting edges tapering at an angle to the central drilling tip (tip cutting edges). As shown, for example, in FIGS. 1 to 6 of EP 3 199 279 A1, each of the two end drilling edges 7 is subdivided into three partial cutting edges 21, 22 and 23. The first inner partial cutting edge 21 and the outermost third partial cutting edge 23 are separated from each other by a recess or groove 8 with a triangular cross-section, i.e. a V-shape. A second partial cutting edge is formed at the end of the groove 8, which extends inwards from the third partial cutting edge and is connected to the first partial cutting edge 21 by a web 16, which is not cutting. The three partial cutting edges 21, 22 and 23 each run in a straight line, the first partial cutting edge 21 and the third partial cutting edge 23 on a common straight line and the second partial cutting edge 22 on an inwardly inclined straight line to it. The reduced feed forces acting on the recess due to this cutting edge design and the inclined partial cutting edges are illustrated in FIG. 5 and the associated figure description of EP 3 199 279 A1. The recess 8 extends from the frontal drill cutting edge with the three partial cutting edges in a straight line to the rear into the back or the free surface 6 of the respective area of the drilling tool. A spiral-shaped flute 2 runs along the partial cutting edges 21, 22 and 23 as a rake face, forming a rake face 2a. The radial distances of the recesses at the two different drill cutting edges are chosen to be the same in the vast majority of example embodiments, i.e. they overlap completely in a rotational projection. In the example embodiment of FIG. 28, the radial distances of the recesses of the two drill cutting edges are slightly different, but nevertheless the two recesses still partially overlap in a rotational projection about the tool axis, i.e. the innermost radial distance of the radially further outward recess is smaller than the outer radial distance of the radially further inward recess. The axial depth of recess 8 shown schematically in FIG. 5 is approximately equal to the axial drilling feed fr and the axial depth of recess 18 shown schematically in FIG. 24 is approximately twice as large as the axial drilling feed fr.

Typical values for axial drill feed are between 0.1 and 0.3 mm per revolution for known twist drills.

SUMMARY OF THE INVENTION

The invention is now based on the object of specifying a drilling tool and a method for producing a bore in a workpiece, in which high drilling feeds are possible. In particular, drilling feeds of at least 9% of the diameter of the drilling area of the drilling tool per revolution, in particular 0.5 mm for a diameter of 5.5 mm, and even more are to be realised.

Embodiments and objects according to the invention suitable for solving this problem are indicated in particular in the claims directed to a drilling tool, in particular having the features of independent claim 1, and a method for producing a bore using such a tool, in particular having the features of claim 18.

Further embodiments and further embodiments according to the invention result from the respective dependent claims.

The claimable combinations of features and subject-matter according to the invention are not limited to the chosen wording and back-references of the claims. Rather, any feature of a claim category, for example a tool, may also be claimed in another claim category, for example a process. Furthermore, any feature in the claims may be claimed in any combination with one or more other feature(s) in the claims, also independently of their back-references. Furthermore, any feature described or disclosed in the description or drawing may be claimed by itself, independently of or apart from the context in which it occurs, alone or in any combination with one or more other feature(s) described or disclosed in the claims or in the description or drawing.

According to claim 1, a drilling tool is proposed which is suitable and intended for producing a bore with a cylindrical inner wall,
  a) wherein the drilling tool is rotatable in a rotary movement with a predetermined rotational direction about a tool axis extending through the drilling tool and at the same time is movable in an axial forward movement in a forward direction axially to the tool axis,
  b) wherein the drilling tool comprises at least one drilling area arranged in a forwardly located region of the drilling tool at a forward or free end, but preferably not having a thread forming region,
  c) wherein the drilling area has a number n of drilling edges which are arranged offset to each other in the rotational direction, where n is a natural number with n≥1, and
  d) wherein at least one chip divider is arranged on at least one or each of the n drill cutting edges, which chip divider forms an interruption of the respective drill cutting edge.

Generally, the drilling area has a number n≥2, i.e. at least two, drill cutting edges which are arranged offset to each other in the rotational direction, in particular with equal pitch by a pitch angle of 360°/n or also with unequal pitch with different pitch angles.

In a particularly advantageous embodiment, the axial depth of the or each chip divider, measured in the axial direction of the tool axis from the associated drill cutting edge, is selected from a range of values from 0.5 times to 1.1 times the axial feed of the associated drill cutting edge relative to the immediately preceding drill cutting edge in the rotational direction, and is preferably at least approximately equal to this axial feed of the associated drill cutting edge. This is particularly expedient in the case of an unequal pitch.

In a further advantageous embodiment, the axial depth of the or each chip divider, measured in the direction axial to the tool axis, is selected from a range of values from 0.5/n to 1.1/n, preferably at least approximately 1/n, multiplied by the axial feed of the drilling tool per revolution. This is particularly expedient in the case of an equal pitch.

Due to these advantageous measures, the axial depth of the chip divider is in the range of the chip thickness and the chip can be completely split accordingly or at least sufficiently weakened to then be split.

The radial distances of the chip dividers from the tool axis on at least two of the n drill cutting edges are different from each other in an advantageous embodiment, namely in such a way that in a rotational projection in the predetermined rotational direction about the tool axis, a chip divider on a first drill cutting edge is followed by a cutting edge region of a subsequent second drill cutting edge, and/or in such a way, that the radial distance of the chip divider at one of the two drill cutting edges at its innermost point closest to the tool axis is greater than the radial distance of the chip divider at the other of the two drill cutting edges at its outermost point furthest away from the tool axis, and/or in such a way that the outer radial distance of the chip divider at one of the two drill cutting edges is smaller than the inner radial distance of the chip divider at the other of the two drill cutting edges.

A radial width of a chip divider, in particular at the interruption of the associated drill cutting edge, is preferably selected from a range of 0.05 times to 0.25 times the diameter of the drilling area.

It is expedient that at least one or each chip divider is designed as a chip divider groove, which forms an interruption at the respective drill cutting edge.

In one embodiment, at least one chip divider groove of the respective chip divider extends from the respective drill cutting edge into an adjacent free surface or sequence of free surfaces. A length of the extension of the chip divider groove can now be adjusted in particular by the free angle or the position of the free surface(s).

In another embodiment, the chip divider groove may also extend along the rake face of the respective drill cutting edge.

The extension of the chip divider groove(s) preferably follows an essentially linear course or a sequence of at least two or three linear groove sections inclined towards each other, in particular inclined inwards towards the tool axis (or convex). In particular, the linear extension of the chip divider groove or its sections can run tangentially to a circle around the tool axis.

Furthermore, the extension of the chip divider groove(s) can also be curved at least in sections, preferably convex to the tool axis.

At least one or each chip divider groove of the respective chip dividers can now, in a preferred embodiment, have a substantially linear course or a sequence of at least two or three linear sections inclined to one another, in particular inclined inwards towards the tool axis, the linear extension of the chip divider groove or its sections running in particular in each case tangentially to a circle around the tool axis. The chip divider groove may also have a shape that is curved at least in sections, preferably convex to the tool axis.

It has been found useful that at least one or each chip divider groove has a cross-section in the form of a trapezoid, the trapezoid preferably opening in the forward direction or towards the drill cutting edge, in particular with an opening angle of between 45° and 90°, preferably at least approximately 60°.

In various embodiments, at least one chip divider or chip divider groove may also have a cross-section in the form of a triangle or trapezoid or dovetail or rectangle or a double wave or a rounded shape, in particular a semicircle, optionally with extended linear side walls.

At least one chip divider can also be designed as a chip divider step.

Generally, each drill cutting edge is arranged and/or formed on an associated web, wherein at least one free surface adjoins each drill cutting edge on each web, in particular on an end face of the web. The free angle of the free surface preferably lies in a radially outer range between 3° to 15° or between 5° to 15°, in particular 6° or 10°, and preferably increases radially inwards, in particular to a value of at the most 40°. The free surface is in particular conical surface or produced with a conical surface grinding, but can also be flat or level.

Preferably, the drilling tool comprises at least one and preferably at least two chip removal groove(s) starting in the drilling area for removing the drilling chips The axial length of the chip removal grooves is generally greater than the maximum bore depth or penetration depth of the tool, so that the chip removal grooves can extend at any time into an area above or outside the workpiece surface and evacuate the chips from the bore.

Preferably, one of the webs runs between each two chip removal grooves.

Chip removal grooves and/or webs preferably run twisted around the tool axis, in particular at a constant or variable twist angle, typically in an interval of 0° to 50°, in particular 20° to 35°, for example 30°.

In advantageous embodiments, at least one chip divider groove extends to an outlet for coolant and/or lubricant in the associated web, the outlet preferably being connected to or forming the mouth of a channel extending in an associated web.

The radial diameter of the drilling area in relation to the tool axis is preferably a maximum of 10 mm (i.e. a size at which chip dividers are not normally used in twist drills).

In all embodiments, the rake face on each drill cutting edge is preferably not provided with a protruding chip forming face or chip forming step, but runs in particular continuously with a comparatively low curvature. This allows the drilling area to be made more compact and axially shorter.

Another advantageous embodiment provides a guide area, in particular axially offset from the drilling area, on the outer circumference of the drilling tool. The guide area has a diameter that corresponds to the outer diameter of the drilling area or is only slightly smaller than it, for example by 0.5 to 2%. This means that the guide area preferably serves to guide the drilling tool itself in the bore produced.

The guide area is preferably divided into individual guide sub-areas, each provided on one of the webs.

Preferably, the guide area, preferably each guide section on each web, has at least one circumferentially extending lubrication groove, preferably at least two axially spaced lubrication grooves, for supplying lubricant, in particular oil, into the guide area during the drilling process. Preferably, each lubrication groove(s) runs along a helix with a pitch corresponding to the axial feed per revolution or per drilling edge.

In a special embodiment, a corner break is provided on the outer areas of the drill cutting edges. A corner break angle of the corner break to the radial direction in the range of 0° to 60°, preferably between 15° and 30°, can now be selected and/or an angle of the corner break (70) to the tool axis (A) can be selected from an interval of 0° and the amount of the helix angle, in particular of the chip removal grooves (25), preferably 0°. A radially measured corner break width of the corner break is preferably between 0.05 mm and 0.4 mm.

The method according to the invention, in particular patent claim 19, is provided for producing a bore with a cylindrical inner wall, in particular without a thread. A drilling tool according to the invention is used and the following process steps—typical for a drilling process per se—are carried out with it:
  the drilling tool is rotated in a forward rotational movement in a predetermined forward rotational direction about the tool axis running through the drilling tool when producing the bore and at the same time is moved in an axial forward movement in a forward direction axially to the tool axis,
  then the drilling tool is moved out of the produced bore in an axial backward direction opposite to the forward direction and meanwhile continues to rotate in the forward rotational direction. This does not allow for thread generation.

In contrast to known drilling methods with twist drills, according to the invention a high axial drilling feed f of the forward movement of the drilling tool per revolution of at least 9% of the diameter of the drilling area of the drilling tool per revolution, in particular at least 0.5 mm per revolution for a diameter of 5.5 mm, and in particular of at least 15% of the diameter of the drilling area of the drilling tool per revolution, in particular at least 0.8 mm per revolution for a diameter of 5.5 mm is preferred. The feed fz per drilling edge is then obtained by multiplying the drilling feed f per revolution (360°) by the ratio of the pitch angle and 360°.

The speed of rotation of the drilling tool at least during the creation of the bore is preferably selected from a range between 1000 rpm to 20,000 rpm. The axial speed when moving the drilling tool out of the bore is generally greater, preferably at least five times greater, than during the axial forward movement.

BRIEF DESCRIPTION OF THE DRAWINGS

The invention is explained further below by means of examples of embodiments. Reference is also made to the drawings, in which.

Corresponding parts and sizes are marked with the same reference signs in FIGS. 1 to 8.

DETAILED DESCRIPTION OF THE PREFERRED EMBODIMENTS

The drilling tool (hereinafter also referred to as tool for short) is designated 2 and is used to produce a cylindrical bore, in particular a blind hole or through hole, and is formed with a drilling area 3 for this purpose, but generally does not include a thread-generating area. If the bore produced is to be threaded, a subsequent step can be carried out with a separate threading tool for this purpose.

The drilling tool 2 is preferably drivable by means of a coupling region on a tool shank 24 extending or formed axially to the tool axis A by means of a rotary drive not shown, in particular a machine tool and/or drive or machine tool spindle, rotationally or in a rotary movement about its tool axis A in a forward rotational direction VD. Furthermore, the tool 2 is axially movable in an axial forward movement VB and in an opposite axial return movement axially to the tool axis A, in particular by means of an axial drive, which in turn may be provided in the machine tool and/or drive or machine tool spindle. An outer diameter of the shank 24 is designated d2.

A drilling area 3 is provided at a free end area or front end of the drilling tool 2 facing away from the coupling area of the shank 24. The drilling area 3 has an outer diameter or drilling diameter d1 and produces a bore with this inner diameter d1 in the workpiece not shown. With its drill tip 33, the drilling area 3 of the rotating tool 2 is placed on the workpiece surface and the drilling process is started.

The drilling tool 2 is on the one hand rotatable or rotationally movable about a tool axis A running through the drilling tool 2 and on the other hand axially or translationally movable along or axially to the tool axis A.

To produce the bore, the drilling tool 2 is moved into a workpiece (not shown) in a working movement composed of a rotary movement about the tool axis on the one hand and an axial feed movement along the tool axis A on the other hand, and the drilling area 3 produces the bore by chip removal. The tool axis A usually coincides with the centre axis of the bore during this drilling process.

When the bottom of the bore or the maximum drilling depth is reached, the drilling tool 2 is moved out of the created bore in a return movement in the axial backward direction opposite to the forward direction of the working movement. During the return movement or when moving the drilling tool out of the bore, a significantly higher axial speed is generally selected than in the working movement during drilling, for example an axial speed that is 5 to 50 times higher. The drilling tool continues to be rotated during the return movement and the direction of rotation or the rotational direction of the drilling tool remains unchanged during the return movement compared to the working movement, i.e. corresponds to the forward rotational direction VD.

The speed of rotation N during drilling is generally selected between 1000 rpm (revolutions per minute) and 20,000 rpm, usually depending on the machine tool and the workpiece and also on the diameter of the drilling tool, for example in such a way that tangential peripheral speeds on the outer diameter of between 30 and 300 m/min are achieved. When pulling out of the bore, the speed can be selected lower, but is generally simply maintained.

The present drilling tool 2 according to the invention is particularly suitable and intended for high axial drilling feeds f.

In the preferred embodiment, the axial feed f of the drilling tool during the axial feed movement during drilling (drilling feed) is selected to be at least 0.5 mm, preferably at least 0.8 mm, per revolution for a diameter d1=5.5 mm (generally 9% or 15% of the diameter d1) and can reach up to 1.5 mm and even up to 2 mm per revolution without limitation of generality. The drilling feed rate f can be adapted to the diameter d1 of the drilling area 3 of the drilling tool 2, whereby with a larger diameter d1 the drilling feed rate f is or can generally also be selected to be larger.

Such a significantly higher drilling feed rate compared to known twist drills is made possible by the special design of the drilling tool according to the invention, which is explained further below by means of example embodiments.

In the illustrated example embodiments, the drilling area 3 comprises two frontal drilling (main) cutting edges 31 and 32, which can be arranged in particular obliquely or conically or also with a predetermined curvature, extending axially forwards and converging towards or in a drill tip 33, in particular in a cone tapering towards the drill tip 33 and/or via a transverse cutting edge 34 connecting the two drill cutting edges 31 and 32 via the drill tip 33. These front drill cutting edges 31 and 32 are designed to cut in the forward rotational direction VD, in the illustrated embodiment right-angled cutting, and remove material from the workpiece 6, which lies axially in front of the drilling tool 2, in a chip-removing manner during the forward movement VB with simultaneous rotary movement in the forward rotational direction VD. In an embodiment not shown, the drill tip 33 can also be designed as a centring tip.

Furthermore, chip removal grooves 25 are provided on the tool 2, which start in the drilling area 3 and continue into the shank 24. Between the chip removal grooves 25, webs (or: ridges) 35 and 36 are arranged and formed. The first drill cutting edge 31 is formed on the first drill web 35 and the second drill cutting edge 32 is formed on the second drill web 36, in each case in the front region or on the end face of the respective web 35 or 36.

Preferably, the chip removal grooves 25 and the webs 35 and 36 between them run twisted around the tool axis A at a constant or also variable twist angle, which typically lies in an interval of 0° to 50°, in particular 20° to 35°, for example 30°, but can also run parallel or axially to the tool axis A. The axial length of the chip removal grooves 25 is preferably chosen to be greater than the maximum bore depth or penetration depth of the tool 2, i.e. the chip removal grooves 25 extend into an area above or outside the workpiece surface. This means that in every phase of the process, the chips produced can be led out of the bore created in the workpiece through the chip removal grooves 25 to the outside.

At each drill cutting edge 31 or 32, the associated chip removal groove 25 forms an associated rake face. The rake angles of these rake faces on the drill cutting edges 31 and 32 are preferably selected in a range between −10° to +45°, whereby preferably the rake angles increase with respect to the tool axis from the inside to the outside and can lie closer to the tool axis in a range between −10° to +10° and lie in the outer range in particular between 15° to 45°, preferably corresponding to the twist angle of the twisted chip removal grooves 25.

On the rear side of the cutting edge 31 or 32 facing away from the rake face or associated chip removal groove 25, there is a free surface 63 or 64, respectively, which is arranged on the front face of the associated drill web 35 or 36.

The free angles of the free surfaces 63 and 64, i.e. the angles between the free surface and a transverse plane running perpendicular to the tool axis A tangentially through the drill cutting edge, are generally selected so that, despite the preferably high axial feed f, friction of the end faces of the drill webs 35 and 36 formed by these free surfaces on the workpiece 2 is avoided. The minimum free angle at a certain radius r can be approximately calculated according to the formula arctan (axial feed per revolution/(2r it)), i.e. here arctan (f/(4r it)), i.e. it increases from the outside to the inside. However, a larger free angle is usually selected to reliably prevent friction.

The free angle of the first free surfaces 63 and 64 adjacent to the drill cutting edges 31 and 32 is preferably selected in a radially outer range between 5° and 15°, in particular 10°, and increases radially inwards, in particular up to the roof angle of the drill tip 33. This ensures a stable drill cutting edge 31 or 32. The free surface 63 and 64 can in particular be of a conical surface shape or produced by conical surface grinding or can also be flat.

The free surfaces 63 and 64 are each kept comparatively narrow by an end recess 61 and 62 created behind them in the rotational direction in the associated web 35 or 36, so that they lie in particular in an angular segment of a maximum of 12° around the tool axis A in each case. The recesses 61 and 62 form further free surfaces adjoining the free surfaces 63 and 64 respectively with larger free angles than the free surfaces 63 and 64. However, in an embodiment not shown, a further preferably flat free surface can also be provided directly behind the free surface 63 or 64 and in front of the recess 61 or 62 with a larger free angle than the free surface 63 or 64, for example 20° to 40°, in particular 30°.

In each of the recesses 61 and 62, an outlet 67 or 68, for example round or convex in cross-section, of a fluid channel for supplying coolant and/or lubricant runs through the respective web 35 or 36, which, like the web 35 or 36, can run axially or also twisted.

According to the invention, chip dividers are now provided on the drill cutting edges of the drilling tool, which divide the chips produced by the drill cutting edges and thus make them narrower, thereby producing in particular band chips. These chips are presumably broken during removal due to the high feed rates and possibly also the brittleness of the material; in any case, the expected process problems with chips were not observed during investigations.

A first chip divider 11 is arranged on the first drill cutting edge 31 and a second chip divider 12 is arranged on the second drill cutting edge 32.

However, chip dividers do not have to be provided on all drill cutting edges and/or more than one chip divider can be provided on a drill cutting edge.

Each chip divider 11 or 12 forms an interruption 21 or 22, respectively, of the respective drill cutting edge 31 or 32. In the illustrated embodiments, the chip divider 11 or 12 divides or separates the associated drill cutting edge 31 and 32 into an inner partial drill cutting edge 31A or 32A, respectively, in the inner region towards the tool axis A and an outer drill part cutting edge 31B or 32B, respectively, in the outer region away from the tool axis A.

The radial distance r1 of the first chip divider 11 from the tool axis A is selected differently from the radial distance r2 of the second chip divider 12. The radial distances r1 and r2 are preferably selected in such a way that there is no overlap between directly adjacent chip dividers 11 and 12 in a rotational projection opposite to the rotational direction of the tool 2, i.e. they are still somewhat radially spaced apart. As a result, in the rotational projection behind a chip divider of one cutting edge lies a cutting edge of the next cutting edge and the chips are thus divided differently and limited in length. In addition, scoring at the bottom of the bore is also avoided.

A radial width b1 of the interruption 21 of the chip divider 11 and a radial width b2 of the interruption 22 of the chip divider 12 are preferably chosen to be equal and/or preferably chosen such that the outer radial distance r3=r2+b2 of the further inward chip divider 12 is smaller than the inner radial distance r1 of the other chip divider 11, whereby an overlap of the interruptions 21 and 22 in the rotational projection is avoided.

Preferred values are selected for the radial widths b1 and b2 from a range of 0.05 d1 to 0.25 d1 and for the radial distance r1 from a range of 0.05 d1 to 0.25 d1 and for the radial distance r2 from a range of 0.25 d1 to 0.4 d1.

In a preferred embodiment, the chip dividers 11 and 12 are formed as chip divider grooves which extend at the end face of the drill webs 35 and 36 from the respective drill cutting edge 31 or 32 into the free face(s) 63 or 64 behind them and, as a rule, also extend and open out into the recesses 61 and 62.

The lengths of the chip divider grooves or chip dividers 11 and 12 are designated l1 and l2, respectively, and can be selected equal to each other and/or variable, in particular also by varying the free angles or the position of the free surfaces 63 and 64 as well as also the position and depth of the recesses 61 and 62.

For a given depth t1 or t2, the length l1 or l2 of the chip divider grooves of the chip dividers 11 and 12 can be adjusted in particular by how the free surface 63 or 64 is inclined, i.e. which free angles are selected. With steeper orientation or larger free angles, the length of the chip divider grooves is shorter and with smaller free angles or a less steep orientation of the free surfaces, the length of the chip divider grooves is longer. The free surfaces 63 and 64 and their comparatively large free angles as well as the recesses 61 and 62 ensure that the rear edges of the chip divider grooves do not rub against the workpiece.

Preferably, the length or extension of the chip dividers or chip divider grooves is chosen so that they extend as close as possible to the outlet for the coolant and/or lubricant, in particular the outlets 67 and 68 in the drill webs 35 and 36 respectively. This allows coolant and/or lubricant to be guided through the chip divider grooves to the drill cutting edge.

Figure 1:
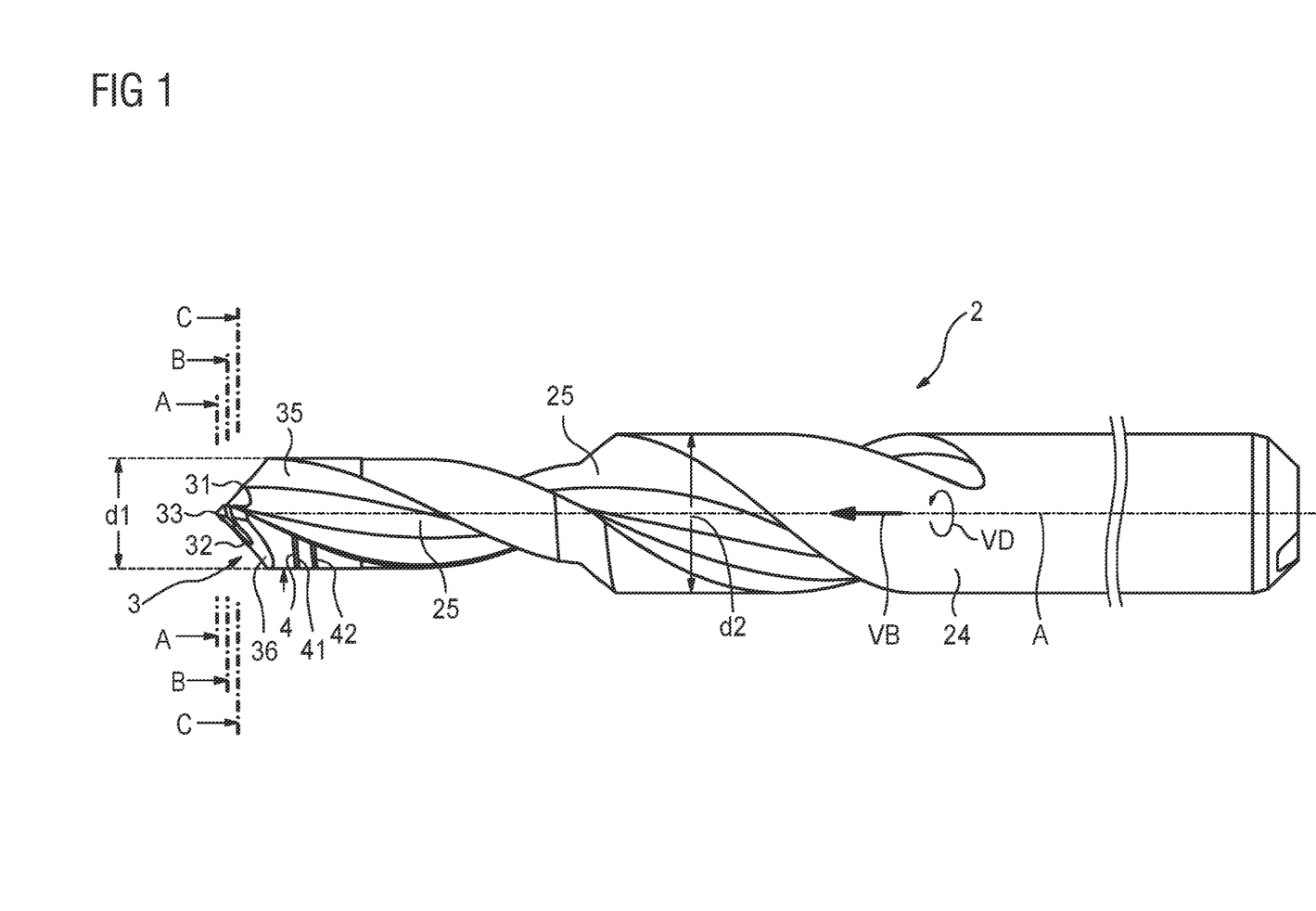
FIG. 1 illustrates a drilling tool in a perspective side view.
Figure 2:
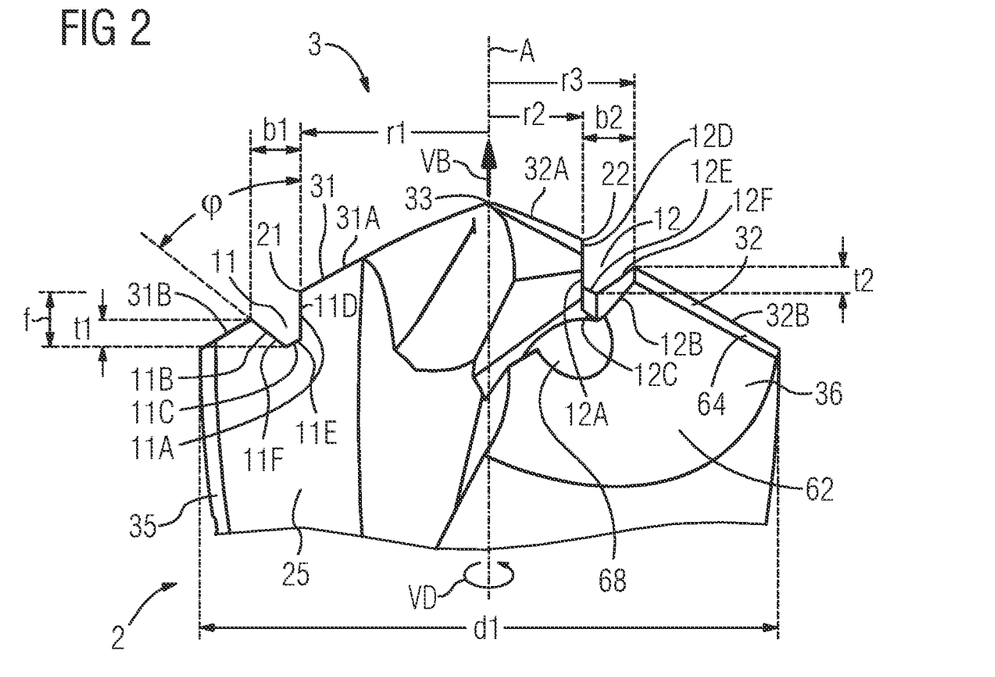
FIG. 2 illustrates an enlarged perspective side view of the drilling area of the drilling tool according to FIG. 1.
Figure 3:
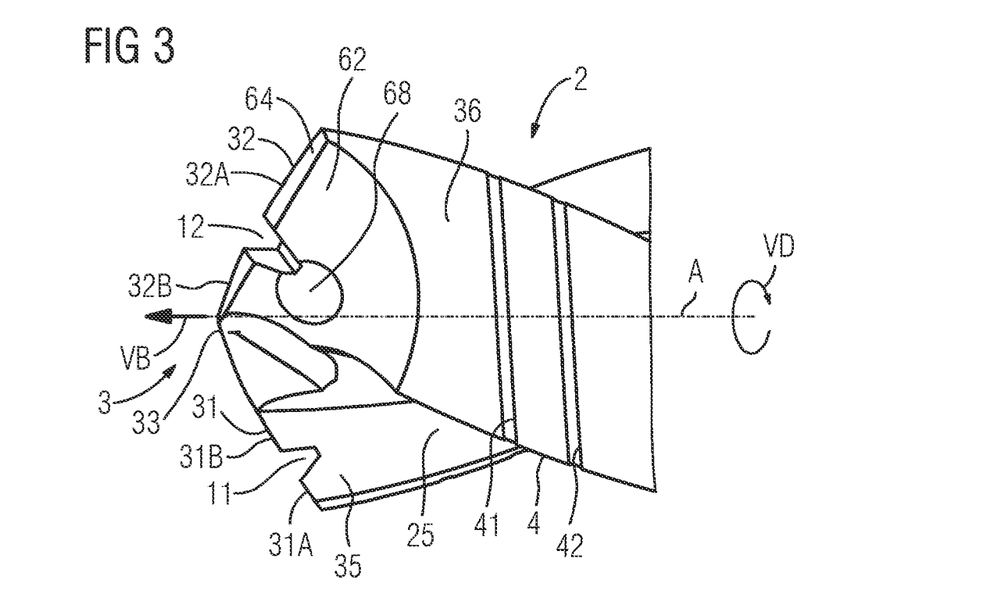
FIG. 3 illustrates an enlarged perspective side view of the drilling area with subsequent guide area of the drilling tool according to FIG. 1.
Figure 4:
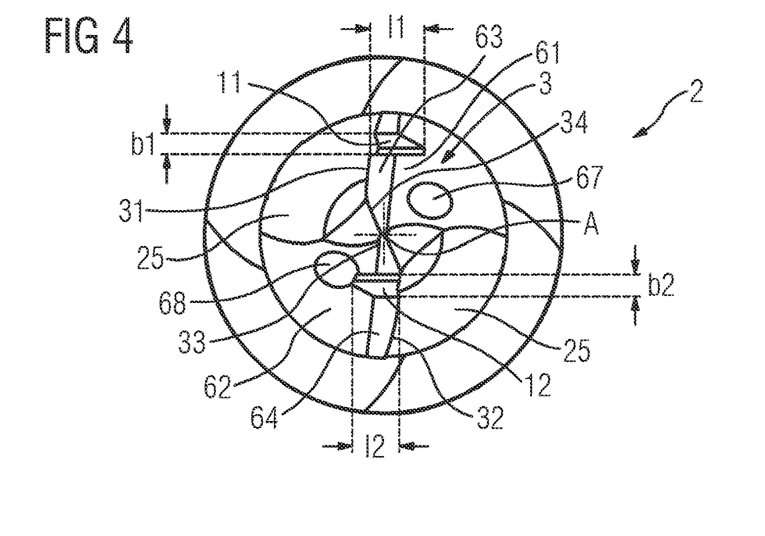
FIG. 4 illustrates an enlarged perspective front view of the drilling area of the drilling tool according to FIG. 1.
Figure 5:
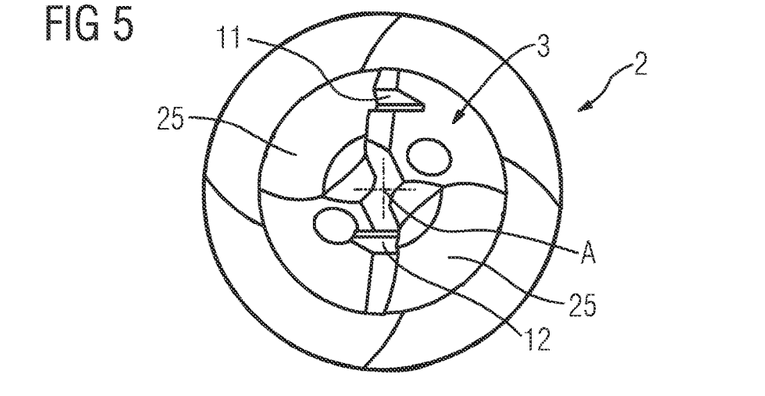
FIG. 5 illustrates a sectional view of the drilling area of the drilling tool according to FIG. 1 according to the cross-section marked B-B in FIG. 1.
Figure 6:
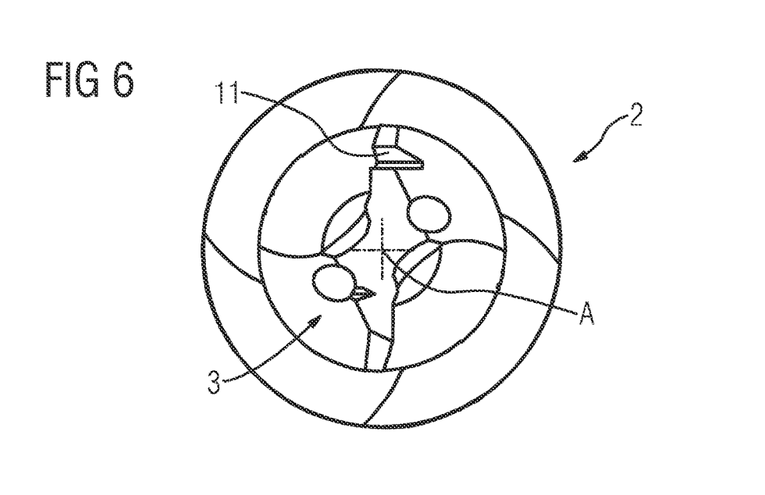
FIG. 6 illustrates a sectional view of the drilling area of the drilling tool according to FIG. 1 according to the cross-section marked C-C in FIG. 1.

Depending on the radial distance r1 and r2 of the chip divider grooves of the chip dividers 11 and 12 on the one hand and the radial distances and cross-sections of the outlets 67 and 68 on the other hand, the chip divider groove can extend only as far as the vicinity of the outlet as shown in the chip divider groove 11 in FIG. 4 or even run directly into the outlet or through the outlet as shown in the chip divider groove 11 and the outlet 67 in FIG. 4. Even with an arrangement in the vicinity of the outlet, a significant part of the coolant and/or lubricant already reaches the cutting edge through the chip divider groove and can have a cooling or lubricating effect there, in addition to the coolant and/or lubricant already reaching the cutting edge from the outside or via the outer sides.

The extension of the chip divider groove from the cutting edge into the flanks or into the rake face can be of completely different shape and length.

For example, as shown in FIG. 4, a linear extension can be chosen which has the advantage of being easily produced with a grinding wheel, whereby the linear extension can be tangential to a circle around the tool axis A or also oblique to a tangential direction and the length l1 or l2 is measured along the linear extension.

Furthermore, a curved course of the extension of the chip divider grooves is also possible. For example, a course along a circle around the tool axis A or another curved curve can be selected. The length with a curved course is then to be determined in particular as an arc length.

In an embodiment not shown, at least one of the chip divider grooves or also each chip divider groove can extend from the drill cutting edge into the flanks or also into the rake face also in the form of two, three or also more, in particular linear, successive sections, which are in particular inclined to each other or arranged at an angle to each other. The linear extension of each section of the chip divider groove(s) can be tangential to a circle around the tool axis A or also oblique to a tangential direction. This allows the chip divider groove to approximate a course along the circumference or along a curvature, in particular circular curvature, especially about the tool axis A, in the manner of a partial polygon. Each linear section can now preferably be created again by a linear movement of a grinding wheel. In addition, chip divider grooves with successive linear and curved sections can also be provided.

The axial depths t1 and t2 of the chip divider grooves 11 and 12 measured in the axial direction of the tool axis A from the interruption 21 or 22 can be selected in a wide range and are preferably equal to each other.

In a particularly advantageous embodiment, the axial depths t1 and t2 of the chip divider grooves of the chip dividers 11 and 12 are set in a range of exactly or approximately half the axial feed (axial drilling feed) f of the drilling tool, in particular in the case of drill cutting edges arranged evenly distributed or at equal pitch angles. Generally, with a number n of drill cutting edges, the axial depth of the chip divider at the drill cutting edge is essentially in a range of f×0.5/n to f×1.1/n, in particular f×0.8/n to f×1/n, preferably at f/n.

Alternatively, the axial depth of each chip divider is set in a range of 0.5 times to 1.1 times the axial feed fz of the associated drill cutting edge relative to the immediately preceding drill cutting edge in the rotational direction. Preferably, the axial depth of the chip divider is at least approximately equal to this axial feed fz per drill cutting edge. This is particularly useful in the case of unequal pitch, i.e. when the drill cutting edges are not distributed at the same pitch angle to each other.

In these embodiments, the axial depth of the chip divider is thus set in the range of the chip thickness so that the chip can be completely split or at least sufficiently weakened so that it can then be easily shaped or broken.

The chip divider grooves or chip dividers 11 and 12 preferably also have a free angle, in particular an axial free angle and/or a radial free angle, preferably from a range of 0° to 20°, in particular 14°, which also affects the axial depth.

The position, shape and length as well as the cross-section of the chip divider grooves can be selected within wide limits depending on the desired chip pitch and other functions and parameters. In this way, chip formation can be influenced differently by different tearing and compressing and wear can also be positively influenced.

In a preferred embodiment, the chip divider grooves of the chip dividers 11 and 12 have a cross-section in the form of a trapezoid at least at the drill cutting edge 31 or 32, but in particular also throughout, which trapezoid opens towards the end face or in the forward direction with an opening angle φ which is selected in particular from a range of 45° to 90°, preferably at about 60°. This design has proven to be advantageous with regard to the free movement in the feed direction.

However, a dovetail-shaped cross-section of the chip divider grooves of the chip dividers 11 and 12 in the form of an undercut trapezoid is also possible, or also a rectangular cross-section of the chip divider grooves of the chip dividers 11 and 12, or also a triangular cross-section, or an at least partially convexly curved or round cross-section, also a cross-section comparable to roughing teeth in milling cutters.

In a preferred embodiment, the drilling tool 2 has a guide area 4 on its outer circumference which is axially set back from the drilling area 3 and is formed along an essentially cylindrical surface and/or has a diameter which corresponds to the outer diameter d1 of the drilling area 3 or is only slightly smaller, for example by 0.5 to 2%. In this way, this guide area 4 serves to self-guide the drilling tool 2 in the bore produced and prevents or reduces displacement of the tool, which can occur due to the high drilling feed and the resulting higher deformation forces. The guide area 4 is divided into individual guide sub-areas, one on each of the webs 35 and 36, which are separated from each other by the chip removal grooves 25.

In order to reduce the frictional heat due to the sliding of the guide area 4 on the inner wall of the bore, the guide area 4 has at least one circumferentially extending lubrication groove in each guide area on each web 35 and 36, in the illustrated example embodiments two axially spaced lubrication grooves 41 and 42. Each lubrication groove(s) can run along a helix, in particular at the pitch angle resulting from the axial feed f or fz, i.e. a helix with the axial feed f per revolution or fz per drill cutting edge as pitch. A different course including a pitch-free course of the lubrication groove(s) is also possible.

Through the lubrication grooves 41 and 42, the guide area 4 is sufficiently lubricated with the lubricant, in particular oil, supplied during the drilling process, in particular by forming a hydrodynamic lubricating film, and the frictional heat between the surfaces of the guide area 4 of the drilling tool 2 sliding on each other and the inner wall of the bore of the workpiece is thereby significantly reduced. In particular, the lubricant passes from the chip removal grooves 25 through the lubrication grooves 41 and 42 to the outer surface of the guide area 4.

Instead of or in addition to the guide areas, peripheral cutting edges or sheath cutting edges can also be provided, which machine or prepare the sheath wall of the bore by removing material from areas of the workpiece 6 that radially adjoin the tool axis A on the outside. These peripheral cutting edges can serve to achieve a sufficient surface finish also of the bore's casing wall and run in particular predominantly parallel or slightly inclined backwards (to reduce friction) to the tool axis A at a radial distance d1/2 from the tool axis A which corresponds to half the bore diameter. The guide areas or circumferential or lateral cutting edges can be formed and/or arranged directly adjacent to the frontal drill cutting edges or can also be slightly offset axially from them.

The drill cutting edges 31 and 32 are generally at least largely linear, but can also at least partially have a slightly curved course, in particular convexly curved in the forward rotational direction VD. Preferably, the drill cutting edges 31 and 32 run at least partially parallel to each other.

The two drill cutting edges 31 and 32 of the depicted drilling area 3 lie in particular on opposite sides of an axially extending centre plane containing the tool axis A. The two drill cutting edges 31 and 32 are, for example, arranged and formed essentially rotationally symmetrical about an angle of rotation of 180° or point symmetrical to the tool axis A, except for the differently arranged chip divider 11 or 12, of course.

In embodiments not shown, there may also be only one drill cutting edge or more than two, for example three or four or five or six, drill cutting edges, i.e. generally n 1 drill cutting edges.

The drill cutting edges 31 and 32 can run towards the drill tip 33, which is located at the central tool axis A, via transverse cutting edges, such as the transverse cutting edge 34. In the centre or in the area of the transverse cutting edges, the rake angle and free angle approach each other. An angle of inclination of the two drill cutting edges 31 and 32 to the tool axis A is preferably the same and can be, for example, between 90° and 135°, in particular 120°.

The drilling tool or at least the drilling area 3 can in particular be made of hard metal or also HSSE or PCD and/or be coated with diamond (diamond like carbon) as a sliding layer. The chip removal grooves can be at least partially polished smooth, in particular on the chip surfaces. The drilling tool can be at least partially manufactured with additive manufacturing. The drilling edges can be provided with an edge rounding.

Figure 7:
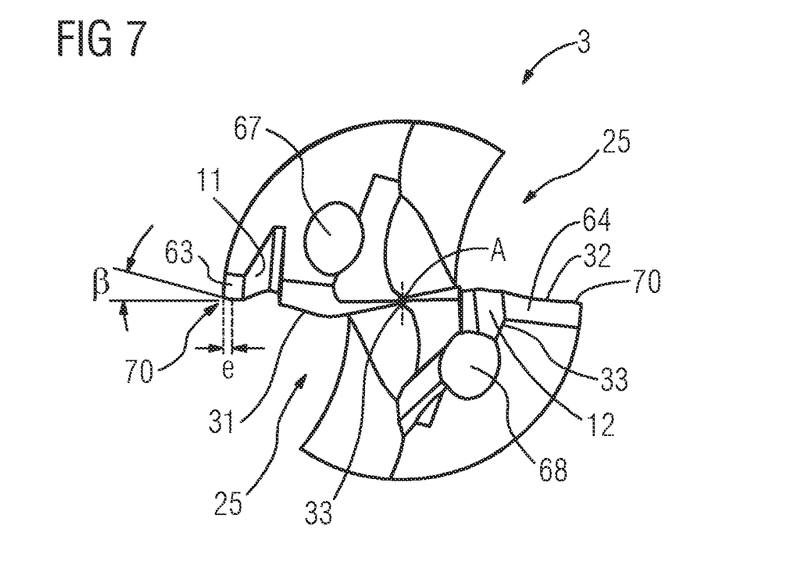
FIG. 7 illustrates a perspective front view of the drilling area of a drilling tool with a corner breakage protection and FIG. 8 illustrates a perspective side view of the drilling area of the drilling tool according to FIG. 7 are shown schematically in each case.
Figure 8:
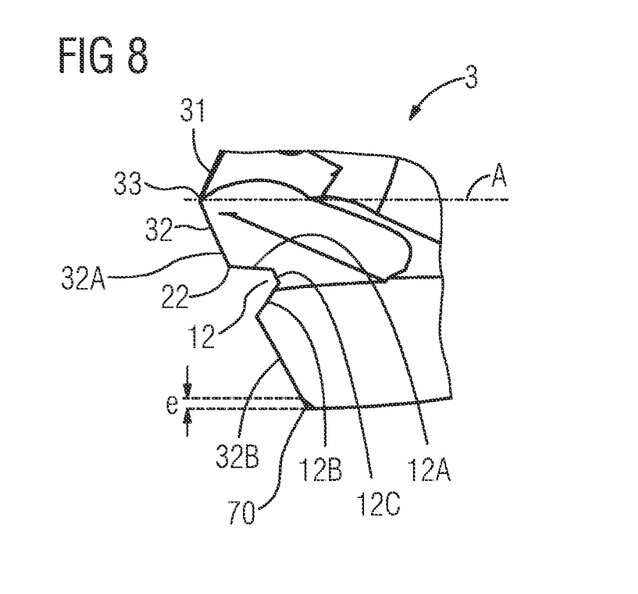

In order to protect the cutting corner in the outer area of the cutting edge and thus increase the service life and reduce wear, a corner break 70 is fitted or provided in the example embodiment according to FIGS. 7 and 8. A corner break angle β of the corner break 70 to the radial direction is in the range of 0° to 60°, preferably between 15° and 30°. A radially measured corner break width e of the corner break 70 is preferably between 0.05 mm and 0.4 mm. The corner break 70 is preferably ground in axial direction and preferably does not follow the twist. Thus, an angle to the axial direction or tool axis A of 0° is preferred. Angles to the tool axis A between 0° and the amount of the twist angle, in particular of the chip removal grooves 25, are generally possible.

LIST OF REFERENCE SIGNS

2 Drilling tool
3 Drilling area
4 Guide area
7 Chip area
11, 12 Chip divider
11A, 11B Chip divider groove
12A, 12B Chip divider groove
20 Work area
21, 22 Interruption
24 Shaft
25 Chip removal groove
31, 32 Drill cutting edge
31A, 31B Partial drill cutting edge
32A, 32B Partial drill cutting edge
33 Drill tip
34 Transverse cutting edge
35, 36 Drill web
41, 42 Lubrication groove
61, 62 Recess
63, 64 Free surface
67, 68 Outlet
70 Corner break
A Tool axis
b1, b2 Width (of the chip divider)
d1, d2 Diameter
e Corner break width
f Axial drill feed
l1, l2 Length (of the chip divider)
t1, t2 Axial depth (of the chip divider)
VB Forward movement
VD Rotational direction
φ Opening angle
β Corner break angle

The invention claimed is:

1. A drilling tool for producing a bore with a cylindrical inner wall, wherein:
a) the drilling tool is rotatable in a rotary movement with a predetermined rotational direction (VD) about a tool axis (A) extending through the drilling tool and at the same time is movable in an axial forward movement (VB) in a forward direction axially to the tool axis;
b) the drilling tool comprises at least one drilling area arranged in a forwardly located region of the drilling tool at a forward or free end, but not having a thread forming region;
c) the drilling area has a number n of drilling edges which are arranged offset to each other in the rotational direction, where n is a natural number with n≥2;
d) a chip divider is arranged on each of the n drill cutting edges, which chip divider forms an interruption of the respective drill cutting edge;
e) the axial depth of each chip divider measured in the axial direction to the tool axis is selected from a range of 0.5/n to 1.1/n multiplied by the axial feed of the drilling tool per revolution;
f) the axial feed of the forward movement of the drilling tool per revolution is at least 15% of a diameter of the drilling area of the drilling tool per revolution; and
g) the diameter (d1) of the drilling area in relation to the tool axis is at most 10 mm.

2. The drilling tool according to claim 1, wherein:
the drill cutting edges are arranged offset to each other in the rotational direction either with equal pitch by a pitch angle of 360°/n or with unequal pitch with different pitch angles.

3. The drilling tool according to claim 2, wherein the axial depth of each chip divider measured in the axial direction of the tool axis from the associated cutting edge is selected from a range of 0.5 times to 1.1 times the axial feed of the associated cutting edge relative to the immediately preceding cutting edge in the rotational direction.

4. The drilling tool according to claim 1, wherein the axial depth of each chip divider measured in the axial direction to the tool axis is selected as at least approximately 1/n multiplied by the axial feed of the drilling tool per revolution.

5. The drilling tool according to claim 1, wherein a radial width (b1, b2) of a chip divider at the interruption of the associated drill cutting edge is selected from a range of 0.05 times to 0.25 times the diameter (d1) of the boring area.

6. The drilling tool according to claim 1, wherein each chip divider is formed as a chip divider groove which forms an interruption at the respective drill cutting edge.

7. The drilling tool according to claim 6, wherein:
each chip divider groove of the respective chip divider has a substantially linear course or a sequence of at least two or three linear sections inclined relative to one another and inclined inwards towards the tool axis; and
the linear extension of the chip divider groove or its sections run in each case tangentially to a circle around the tool axis, or also having a course which is curved at least in sections, convexly to the tool axis.

8. The drilling tool according to claim 6, wherein:
each chip divider groove has a cross-section in the form of a trapezoid; and
the trapezoid opens in the forward direction or towards the drill cutting edge with an opening angle of between 45° and 90°.

9. The drilling tool according to claim 6, wherein:
each chip divider groove of the respective chip divider extends from the respective drill cutting edge into an adjacent free surface and optionally further free surface(s); and
a length (l1, l2) of the extension of the chip divider groove is at least partially defined by the free angle or the position of the free surface(s).

10. The drilling tool according to claim 1, wherein:
each drill cutting edge is arranged and/or formed on an associated web;
for at least one free surface adjoining each drill cutting edge on each web, on an end face of the web, the free angle of the free surface is selected in a radially outer range of between 3° to 15°, and increases radially inwards to a value of at most 40°; and/or
the free surface is in the form of a conical surface or is produced with a conical surface grinding or is flat.

11. The drilling tool according to claim 1, comprising:
at least two chip removal grooves which:

start in the drilling area, and/or whose axial length is greater than the maximum penetration depth of the drilling tool;

wherein the chip removal grooves can extend at any time into an area above or outside the workpiece surface and remove the chips from the bore.

12. The drilling tool according to claim 10, wherein:

one of the webs runs between each two chip removal grooves; and/or the chip removal grooves and/or the webs run twisted about the tool axis at a constant or variable twist angle which typically lies in an interval of 0° to 50°.

13. The drilling tool according to claim 1, wherein each chip divider grooves extends to an outlet for coolant and/or lubricant, the outlet being connected to a channel extending in an associated web.

14. The drilling tool according to claim 1, wherein:

a rake face adjoins each cutting edge and the rake face is not provided with a chip forming face or chip forming step.

15. The drilling tool according to claim 1, further comprising:

a guide area axially offset from the drilling area on its outer circumference;

wherein the guide area:

has a diameter which corresponds to the outer diameter (d1) of the drilling area or is only slightly smaller than the latter;

provides the self-guidance of the drilling tool in the bore produced; and/or is subdivided into individual guide sub-areas which are each provided on one of the webs.

16. The drilling tool according to claim 15, wherein:

the guide area, each guide sub-area on each web, has at least one lubrication groove running in the circumferential direction, at least two mutually axially spaced lubrication grooves, for supplying lubricant into the guide area during the drilling process; and each lubrication groove(s) runs along a helix with a pitch corresponding to the axial feed per revolution or per drill cutting edge.

17. The drilling tool according to claim 1, wherein a corner break is provided on the outer areas of the drill cutting edges, wherein:

a corner break angle (β) of the corner break to the radial direction lies in the range of 0° to 60°, a radially measured corner break width (e) of the corner break is between 0.05 mm and 0.4 mm, and/or an angle of the corner break to the tool axis (A) is selected from a range of 0° and the amount of the helix angle.

18. The drilling tool according to claim 1, wherein the radial distances (r1, r2, r3) of the chip dividers from the tool axis (A) are different at at least two of the n drill cutting edges in such a way that:

the radial distance of the chip divider at one of the two drill cutting edges at its innermost point closest to the tool axis is greater than the radial distance of the chip divider at the other of the two drill cutting edges at its outermost point furthest away from the tool axis, and/or the outer radial distance (r3) of the chip divider at one of the two drill cutting edges is smaller than the inner radial distance (r1) of the chip divider at the other of the two drill cutting edges.

19. A drilling tool for producing a bore with a cylindrical inner wall, wherein:

a) the drilling tool is rotatable in a rotary movement with a predetermined rotational direction (VD) about a tool axis (A) extending through the drilling tool and at the same time is movable in an axial forward movement (VB) in a forward direction axially to the tool axis;

b) the drilling tool comprises at least one drilling area arranged in a forwardly located region of the drilling tool at a forward or free end, but not having a thread forming region;

c) the drilling area has a number n of drilling edges which are arranged offset to each other in the rotational direction, where n is a natural number with n≥2;

d) a chip divider is arranged on each of the n drill cutting edges, which chip divider forms an interruption of the respective drill cutting edge;

e) the axial depth of each chip divider measured in the axial direction to the tool axis is selected from a range of 0.5/n to 1.1/n multiplied by the axial feed of the drilling tool per revolution;

f) the radial distances of the chip dividers from the tool axis are different at at least two of the n drill cutting edges in such a way that, in a rotational projection in the predetermined rotational direction about the tool axis, a chip divider on a first drill cutting edge is followed by a cutting edge region of a subsequent second drill cutting edge;

g) each drill cutting edge is formed on an associated web; and h) for at least one free surface (63, 64) adjoining each drill cutting edge on each web, on an end face of the web, a free angle of the free surface between the free surface and a transverse plane running perpendicular to the tool axis (A) is selected in a radially outer range of between 5° to 15°, and increases radially inwards to a value of at most 40°.

20. A drilling tool for producing a bore with a cylindrical inner wall, wherein:

a) the drilling tool is rotatable in a rotary movement with a predetermined rotational direction (VD) about a tool axis (A) extending through the drilling tool and at the same time is movable in an axial forward movement (VB) in a forward direction axially to the tool axis;

b) the drilling tool comprises at least one drilling area arranged in a forwardly located region of the drilling tool at a forward or free end, but not having a thread forming region;

c) the drilling area has a number n of drilling edges which are arranged offset to each other in the rotational direction, where n is a natural number with n≥2;

d) a chip divider is arranged on each of the n drill cutting edges, which chip divider forms an interruption of the respective drill cutting edge;

e) the axial depth of each chip divider measured in the axial direction to the tool axis is selected from a range of 0.5/n to 1.1/n multiplied by the axial feed of the drilling tool per revolution; and f) a corner break (70) is provided on the outer areas of the drill cutting edges, wherein:

a corner break angle (β) of the corner break to the radial direction lies in the range between 15° and 30°, and a radially measured corner break width of the corner break is between 0.05 mm and 0.4 mm.

* * * * *